United States Patent [19]

McKale et al.

[11] Patent Number: 4,968,423
[45] Date of Patent: Nov. 6, 1990

[54] FILTER LEAF

[75] Inventors: Gary W. McKale, East Aurora; Anthony F. McGowan, Lakeview, both of N.Y.

[73] Assignee: The Duriron Company, Inc., Dayton, Ohio

[21] Appl. No.: 825,021

[22] Filed: Jan. 31, 1986

[51] Int. Cl.⁵ ............................................. B01D 29/15
[52] U.S. Cl. ..................................... 210/346; 210/486; 55/492
[58] Field of Search ..................... 210/322, 323.1, 330, 210/331, 346, 483, 486, 487; 55/492

[56] References Cited

U.S. PATENT DOCUMENTS

| | | | |
|---|---|---|---|
| 2,249,063 | 7/1941 | Swem | 210/195 |
| 2,409,705 | 10/1946 | Reinhardt | 210/195 |
| 2,902,165 | 9/1959 | Imershein | 210/486 |
| 3,262,577 | 7/1966 | Tuit | 210/487 |
| 3,270,888 | 9/1966 | Anderson | 210/331 |
| 3,283,906 | 11/1966 | Crane et al. | 210/331 |
| 3,315,336 | 4/1967 | Parker et al. | 210/487 |
| 3,669,267 | 6/1972 | Hutton | 210/231 |
| 3,679,062 | 7/1972 | Burkhardt | 310/486 |
| 3,948,779 | 4/1976 | Jackson | 210/331 |
| 4,022,695 | 5/1977 | Howard et al. | 210/331 |

OTHER PUBLICATIONS

Random House College Dictionary, revised edition 1980, pp. 580 and 1359.

Primary Examiner—Richard V. Fisher
Assistant Examiner—Wanda L. Millard
Attorney, Agent, or Firm—Biebel, French & Nauman

[57] ABSTRACT

A filter leaf having a drainage member which is fabricated by combining a plurality of preforated and texturized sheets into a sandwich structure. The drainage member is covered in both sides by a pair of surface screens, and the entire assembly is secured together by a suitable frame.

8 Claims, 1 Drawing Sheet

FILTER LEAF

BACKGROUND OF THE INVENTION

The present invention relates to the field of liquid filtration and, more particularly, to pressure leaf filters. These filters typically comprise a pressure vessel containing a plurality of filter leaves. An unfiltered liquid is introduced into the vessel under pressure where it is forced through the filter leaves. The filter leaves have internal drain connections which permit the filtered liquid to pass to the outside of the pressure vessel. Such filters are commonly called cake filters due to the fact that the removed solids form a cake on the surface of the filter leaves. The cake, in fact, acts as a filter medium. The filter leaves function mainly to retain the cake and to provide sufficient cross-sectional drainage area to enable the filtered liquid to be evacuated as quickly as possible.

In order to function satisfactorily, a filter leaf must have a surface screen which remains flat and tight during operation. For this reason, it is customary to support filter leaf screens on internal drainage members having the necessary structural integrity. In recent years the structural requirements for such drainage members have become increasingly severe, as filter sizes have increased to cope with ever increasing flow requirements and ever decreasing limits on the amount of allowable solids in the filtered liquids. As noted above, filter leaf drainage members must provide both flow and rigidity. They must also be adapted for attachment to other structural members and have the same shape as the surface screens.

Popular drainage members used today are 4×4×0.080 woven wire screen and tubular slit, which is a piece of sheet metal pressed or formed to provide flow passages. However, the wire screen does not provide sufficient liquid flow for large size leaves, and tubular slit is a weak material in large sheet sizes. The tubular slit tends to buckle and deflect very easily under applied loads and requires special manufacturing assembly procedures to keep it sufficiently flat for properly supporting the surface screens and allowing attachment to a peripheral frame. Such special manufacturing necessarily are quite costly.

It is therefore seen that there is a need for a filter leaf having an improved drainage member which may be produced at low cost and yet provide the surface flatness, structural rigidity and flow rates required in modern filter applications.

SUMMARY OF THE INVENTION

The above-mentioned need is satisfied by a filter leaf wherein a pair of opposed fine mesh surface screens are supported against an interiorly positioned drainage member comprising a plurality of perforated and texturized sheets which are secured in non-conforming contact. The drainage member and the surface screens are all of like shape and size and are secured together within a surrounding frame member. A variety of different texturizing patterns may be applied to the perforated sheets, and it is preferred that adjacent ones of the perforated sheets have different texturizing patterns.

Accordingly, it is an object of this invention to provide a drainage member which is economical to produce and which has the flow characteristics and the structural integrity required for large scale installations.

Other objects and advantages of the invention will be apparent from the following description, the accompanying drawings and the appended claims.

DESCRIPTION OF THE PREFERRED EMBODIMENT

Figure 1:
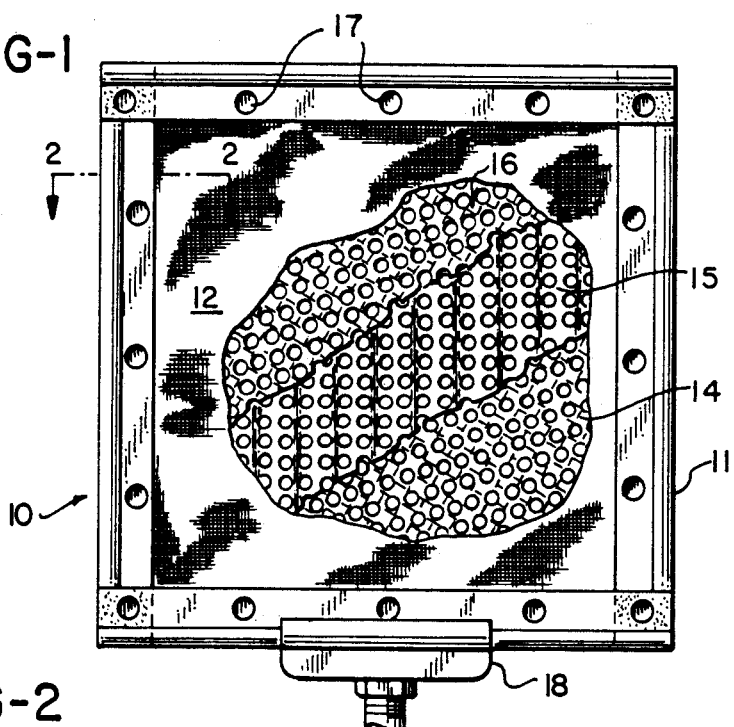
FIG. 1 is a partially cut away plan view of a filter leaf according to the present invention.
Figure 2:
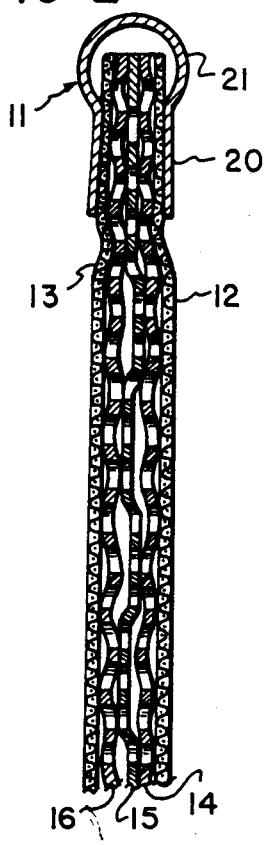
FIG. 2 is an enlarged cross-sectional view taken along lines 2—2 of FIG. 1.

A filter leaf in accordance with the present invention may be generally configured as illustrated by the reference numeral 10 of FIG. 1. Thus the filter leaf may comprise a frame member 11 supporting a sandwich structure as best illustrated in FIG. 2. The sandwich structure comprises a pair of opposed and parallel fine mesh surface screens 12, 13 supported by a drainage member comprising a plurality of perforated and texturized sheets, such as sheets 14, 15 and 16. All components of the sandwich structure are of like shape and size and are secured inside frame member 11 by a series of spot welds 17. It will be appreciated, however, that rivets, bolts or other fastening means may be provided.

Frame member 11 is preferably a keyhole frame having an enlarged portion 21 and a clamping portion 20. An outlet fitting 18 is attached to frame member 11 for receiving filtrate which has passed through the filter sandwich and collected within the portion 21 of frame member 11.

It will be appreciated that surface screens 12, 13 may take various forms. However, the screens are preferably woven micronic wire cloths. The cloth material may have openings as large as 250 microns in diameter. The screen must be sufficiently porous to limit pressure drop but not too porous for supporting a cake of particulate filter material. Typical openings range from 30 to 250 microns in diameter. A preferred opening is about 60 microns in diameter.

As illustrated in FIG. 1, frame member 11 defines a square filtration area, but rectangular, circular or other configurations may be used. However, in order to obtain the full benefit of the improved drainage member of the present invention, frame member 11 typically has a diagonal dimension equal to or greater than about 36 inches. For very large installations, the drainage member may comprise five, seven or more perforated and texturized sheets.

Figure 3:
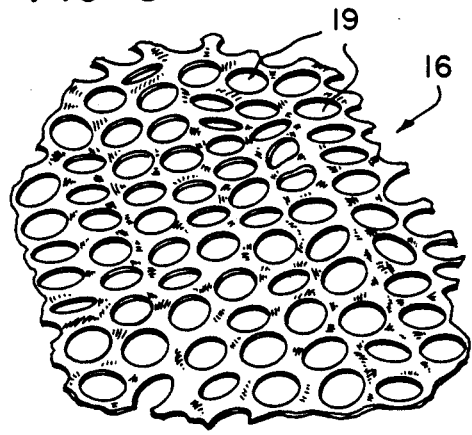
FIG. 3 is an enlarged plan view of a portion of a perforated and texturized sheet.

Sheets 14, 15 and 16 may be fabricated from any metallic or plastic material such as, for instance, carbon steel, stainless steel, titanium, hastelloy, incolloy, polypropylene, and rubber coated carbon steel. In a typical installation, these sheets may have a thickness ranging from about 0.018 inches to about 0.075 inches and may be provided with a series of perforations 19, as illustrated in FIG. 3. Perforations 19 may have a diameter ranging from about 1/32 inch to about ¼ inch with about ⅛ inch being preferred. The center-to-center spacing may range from about 1/16 inch to about ⅜ inch. Perforations 19 may be fabricated in sheets of stainless steel by punching or any other convenient process.

After the sheets are perforated, they are texturized by any convenient hot forming or cold forming process. By way of example, previously perforated sheets may be rolled between a pair of rollers having surfaces into which appropriate texturizing patterns have been engraved. A variety of texturizing patterns may be used. For example, perforated sheets 14 and 16 have a crinkled texture, whereas perforated sheet 15 has a ribbed texture. The texturizing process may produce a surface deformation ranging from about 0.02 inch to about 00.1 inch.

In order to provide intertices of sufficient size for filtrate flow, the texturized sheets must be secured in non-conforming contact. This is most conveniently achieved by utilizing different texturizing patterns in adjacent sheets. Alternatively, such non-conforming contact may be achieved by careful positioning and orientation of adjacent sheets having similar textures. In a typical three-ply drainage member, there is provided a cross-sectional flow area of about 0.184 square feet per inch of width. Such a structure is sufficiently rigid to allow itself to be welded, riveted or otherwise fastened to any style of peripheral frame and to enable sealing of such a frame against any surface screen. The structure is also sufficiently rigid to hold the surface screen tightly enough to prevent screen flexing and resulting cracking of the filter cake thereon.

While the invention has been described in detail and by reference to a specific embodiment thereof, it will be apparent to those skilled in the art that numerous variations and modifications are possible without departing from the spirit and scope of the following claims:

What is claimed is:

1. A filter leaf comprising:
    a pair of opposed and parallel fine mesh surface screens of like shape and size;
    a drainage member sandwiched supportingly between said surface screens,
    a frame member surrounding and securing said surface screens and said drainage member, and
    an outlet fitting for receiving a flow of filtrate from said drainage member;
    said drainage member comprising a plurality of sheets each of which have been perforated and thereafter texturized; said sheets being of like size and shape as said surface screens and being secured in non-conforming contact.

2. A filter leaf according to claim 1 wherein adjacent ones of said perforated sheets have different texturizing patterns.

3. A filter leaf according to claim 1 wherein said frame member surrounds a filtration area having a diagonal dimension greater than about 36 inches.

4. A filter leaf according to claim 1 wherein said perforated sheets are provided with circular perforations having a diameter ranging from about 1/32 inch to about ¼ inch and a center to center spacing ranging from about 1/16 inch to about ⅜ inch.

5. A filter leaf according to claim 4 wherein said perforated sheets have a thickness ranging from about 0.018 inches to about 0.075 inches and are texturized by surface deformations ranging from about 0.02 inch to about 0.1 inch.

6. A filter leaf according to claim 5 wherein adjacent ones of said perforated sheets have different texturizing patterns.

7. A filter leaf according to claim 6 wherein said frame member surrounds a filtration area having a diagonal dimension greater than about 36 inches.

8. A filter leaf according to claim 7 wherein said perforations have a diameter of about ⅛ inch.

* * * * *